(12) United States Patent
Hahn

(10) Patent No.: US 11,760,430 B2
(45) Date of Patent: Sep. 19, 2023

(54) LIFT ASSEMBLY FOR A VEHICLE

(71) Applicant: Jesse James Hahn, Cedar Rapids, IA (US)

(72) Inventor: Jesse James Hahn, Cedar Rapids, IA (US)

(*) Notice: Subject to any disclaimer, the term of this patent is extended or adjusted under 35 U.S.C. 154(b) by 0 days.

(21) Appl. No.: 17/092,955

(22) Filed: Nov. 9, 2020

(65) Prior Publication Data
US 2021/0139096 A1    May 13, 2021

Related U.S. Application Data

(60) Provisional application No. 62/932,642, filed on Nov. 8, 2019.

(51) Int. Cl.
*B62H 3/10* (2006.01)
*B66F 7/06* (2006.01)
*B66F 7/08* (2006.01)

(52) U.S. Cl.
CPC .............. *B62H 3/10* (2013.01); *B66F 7/065* (2013.01); *B66F 7/08* (2013.01); *B66F 2700/055* (2013.01); *B66F 2700/123* (2013.01)

(58) Field of Classification Search
CPC ... B62H 3/10; B66F 7/065; B66F 7/02; B66F 7/08; B66F 7/00; B66F 7/085; B66F 7/16; B66F 9/12
USPC ....................................................... 254/10 B
See application file for complete search history.

(56) References Cited

U.S. PATENT DOCUMENTS

| | | | | |
|---|---|---|---|---|
| 3,618,894 A * | 11/1971 | Meyer | ...................... | B66F 3/24 254/8 R |
| 4,700,798 A * | 10/1987 | Johansson | ............ | G09B 19/167 180/209 |
| 5,516,128 A * | 5/1996 | Nakade | ................. | B62B 3/0606 280/43.12 |
| 5,716,061 A * | 2/1998 | Sloan | ........................ | B66F 5/02 254/9 B |
| 6,050,546 A * | 4/2000 | Peschmann | ............. | B66F 5/025 254/10 B |
| 8,469,338 B2 * | 6/2013 | Gann | ........................ | B66F 3/30 254/1 |
| 9,999,555 B2 * | 6/2018 | Magill | ................. | A61G 1/0256 |
| 2003/0173753 A1 * | 9/2003 | Pong | ........................ | B62B 1/12 280/47.27 |
| 2007/0116548 A1 * | 5/2007 | Cooper | ................... | B66F 9/142 414/619 |
| 2008/0056871 A1 * | 3/2008 | Morgan | ................ | B62B 3/0643 414/800 |
| 2009/0189135 A1 * | 7/2009 | Van Der Westhuizen | ................... | B62H 3/10 254/93 H |
| 2016/0041557 A1 * | 2/2016 | Trout | ................... | G05D 1/0272 701/25 |

* cited by examiner

*Primary Examiner* — Seahee Hong
(74) *Attorney, Agent, or Firm* — SHUTTLEWORTH & INGERSOLL, PLC; Elizabeth L. Souer

(57) ABSTRACT

An integrated lift and dolly is presented which includes a lift mechanism for elevating a vehicle while simultaneously positioning wheels underneath to enable moving the vehicle as the vehicle's wheels are elevated off the ground. The lift assembly can further elevate the supporting frame to remove weight from the wheels of the lift assembly to allow long term storage without relying on the wheels to support the weight of the vehicle. This integrated lift and dolly lifts and supports the vehicle for storage and also facilitates easier service, inspection and cleaning.

19 Claims, 17 Drawing Sheets

LIFT ASSEMBLY FOR A VEHICLE

This application claims priority to U.S. Provisional Patent Application No. 62/932,642 filed Nov. 8, 2019, which application is incorporated by reference herein.

BACKGROUND OF THE INVENTION

Small vehicles such as motorcycles, trikes, UTVs, and ATVs are generally heavy and difficult to maneuver around or turn in garages and other storage buildings and in driveways. In addition, these vehicles can take up a lot of space inside a garage or other storage facility. Typically, motorcycles are parked and stored in an upright, slanted position using a kickstand. In particular, a motorcycle takes up more floor space when parked than during use due to its leaning position while on its kickstand. It is also more difficult to work or clean the motorcycle while leaning on its kickstand. Motorcycle owners struggle with balancing its weight while trying to reposition the motorcycle for storage, service or general parking.

Several manufacturers have attempted to deliver solutions in the form of floor jacks, a caster dolly for the rear wheel, a caster dolly for center stand, and a caster dolly tray carrying both wheels and kickstand. Because vehicles, especially motorized vehicles are very heavy, many of the simple under-frame dollies also require the use of a separate lift mechanism to get the vehicle high enough to position the dolly underneath the frame. This two-step method has proven to be clumsy and time consuming. In order to pass under the frame of the vehicle without the use of a lift, some of the dollies have small casters in the range of 1.5-2" in diameter. Casters with wheels with 1.5-2" diameters also include a caster stem and have an overall caster height of 3-4". However, dollies with wheels of this size have been found difficult to roll around, and don't caster well on the typical garage floor or driveway, whereas larger diameter wheels would allow for easier maneuverability, but won't fit under low-profile vehicles like motorcycles and snowmobiles.

Another attempted solution includes a lift assembly wherein casters are manually attached after the vehicle has been lifted off the ground to allow the necessary clearance for larger casters that are easier to maneuver. However, this is time-consuming and requires manual removal of the casters when the operator desires to lower the vehicle. The removable casters must then be stored for the next use.

Moreover, these solutions are generally heavy and awkward to move. Products marketed to lift and move vehicles may weigh ninety pounds or more. Therefore, there is a need for an improved, lightweight integrated lift dolly for use in motorcycle, trike, UTV and ATV, lawnmower, tractor, snowblower, and snowmobile transport, maintenance, cleaning, and repositioning and storage in tight quarters.

SUMMARY OF THE INVENTION

The integrated lift assembly disclosed herein is designed to lift and support a vehicle such as a motorcycle for storage, transport, maintenance, cleaning, and repositioning in tight quarters. Such vehicles may be motorized or non-motorized. In one embodiment, the lift assembly includes a frame with a front portion which is adjustably lowered to fit under the frame of a vehicle, allowing larger wheels to fit under a vehicle frame, solving the clearance problem posed by larger wheels in other lifts and dollies. The front portion of the lift assembly is then raised, and the vehicle is supported by its frame as it is moved or lifted with the lift mechanism. In a further embodiment, the front portion and the back portion maybe adjustably lowered in tandem or independently to fit under a vehicle frame. The integrated lift/dolly assembly includes wheels for easy movement of the vehicle, allowing the supported motor vehicle to be moved in any direction and to rotate about the center vertical axis of the vehicle.

DETAILED DESCRIPTION OF THE INVENTION

The lift assembly disclosed herein lifts and supports a vehicle and allows the vehicle to be moved freely in tight quarters. This is advantageous for repositioning, servicing, cleaning, and inspecting. The features disclosed herein also solve the clearance problem associated with large wheels fitting under the frame of the motor vehicle by adjustably lowering the front portion 130 of the frame of the lift assembly relative to the back portion 140. In another embodiment, both the front portion 130 and the back portion 140 may be adjustably lowered either in tandem or independently from one another.

Figure 1:
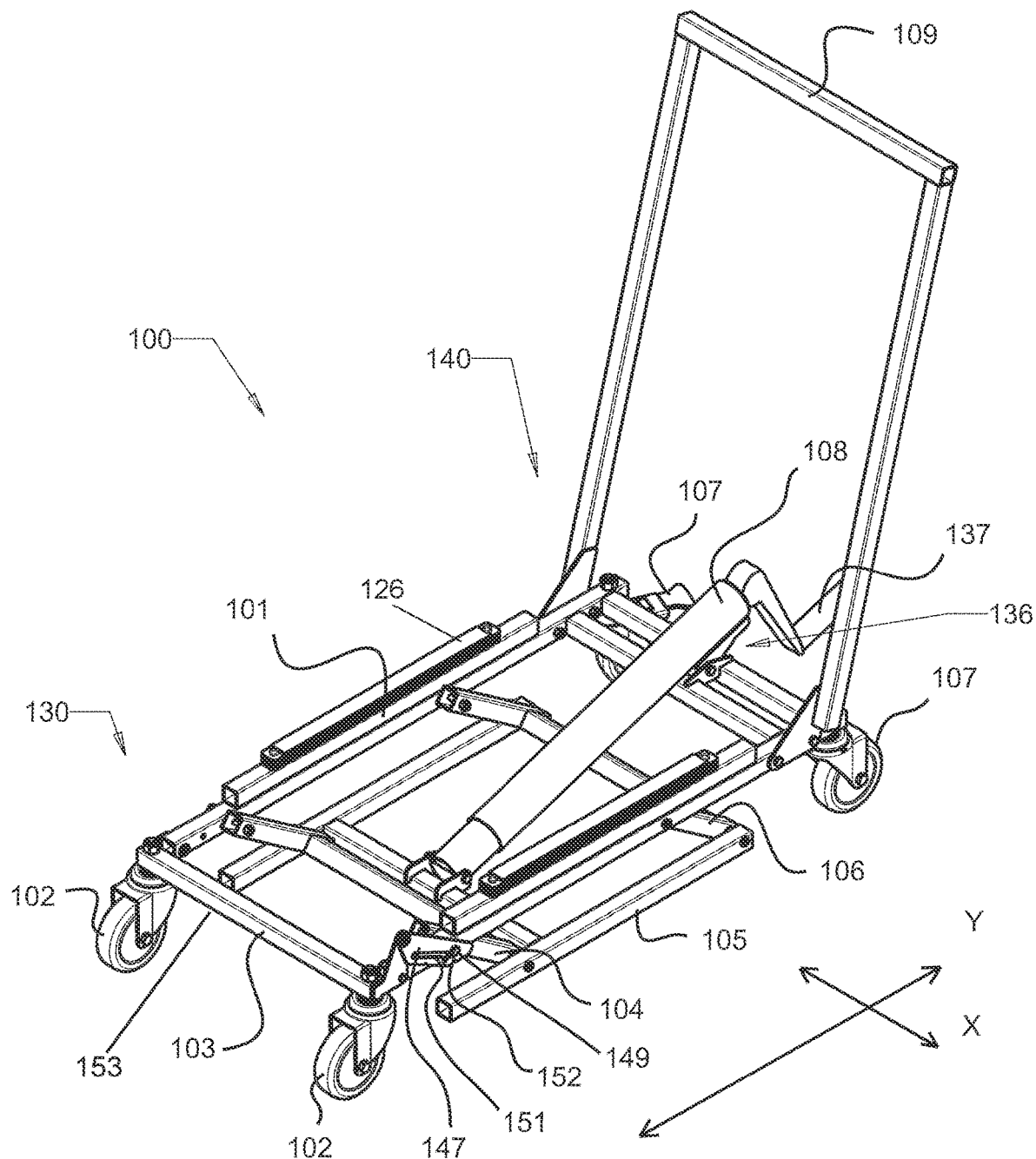
FIG. 1 is an isometric view of the lift assembly.

FIG. 1 shows a front view of the lift assembly 100 including a dolly frame 101 with two front wheels 102 at the front portion 130 of the dolly frame 101 and two back wheels 107 at the back portion 140 of the dolly frame 101. The front portion 130 of the dolly frame 101, is located at the leading edge 153 of the dolly frame 101. The two front wheels 102 are attached to a hinged frame element 103 hingedly connected to the front portion 130 of the dolly frame 101. In an embodiment wherein both the front portion 130 and the back portion 140 of the dolly frame 101 are adjustably lowered, respective hinged frame elements 103 may be hingedly connected to both the front portion 130 and the back portion 140. The hinged frame element 103 allows wheels 102 to be moved from a second position under the dolly frame 101 to a lowered, first position, raked out at an angle in front of the dolly frame 101, so that the wheels 102 are still able to roll and support the weight of the lift assembly 100, but the front portion 130 of the lift assembly 100 is lowered to easily fit under a vehicle, such as a motorcycle. In another embodiment, the wheels 102 may be raked in at an angle underneath the dolly frame 101 toward the back portion 140. The hinged frame element 103 may be hingedly connected to the dolly frame 101 via any hinge, and in particular, a pin hinge.

This hinged design allows for larger wheels 102, 107 to fit under a low-profile vehicle because they are angled with respect to a direction perpendicular to the xy plane in FIG. 1. In one embodiment, wheels 102, 107 with 4-6" diameters and overall caster heights of 5-7" may be used. In a further embodiment wheels 102, 107 may have diameters greater than 6" and overall caster mounting heights greater than 7".

In the first position the front portion 130 of the lift assembly 100 may be rolled under the vehicle without interference with the bottom of the frame of the vehicle. Once the lift assembly 100 is in place under the vehicle, the front portion 130 may be raised by the lift mechanism 136, allowing the hinged frame element 103 to pivot relative to the dolly frame 101 so that the front wheels 102 are back to the second position under the dolly frame 101.

Once front wheels 102 are in the second position under the dolly frame 101, the hinged frame element 103 may be locked into place in the second position by a lock plate 147 shown in FIG. 1. In one embodiment, the lock plate 147 is be pivotally attached to the hinged frame element 103 and includes a channel embodied as a slot 151 along the lock plate 147, through which a guide pin 149 attached to the dolly frame 101 navigates while the hinged frame element 103 pivots relative to the dolly frame 101, as depicted in FIG. 2C. The hinged frame element 103 may pivot relative to the dolly frame 101 due to a force, in particular gravitational force, acting on the hinged frame element 103 as the dolly frame 101 is lifted. In one embodiment, the force acting on the hinged frame element 103 may be a spring force. Once the hinged frame element 103 reaches the second position and the wheels 102 are located under the dolly frame 101, the slot 151 of the lock plate 147 may include a locking portion 152 which locks the guide pin 149 in position, and keeps the hinged frame element 103 from further rotation with respect to the dolly frame 101. In a further embodiment, the lock plate 147 may include further locking portion to lock the hinged frame element 103 in the first position, raked out from the dolly frame 101. The lock plate 147 may include a release notch 161 located along the slot 151, as shown in FIG. 2C.

The dolly frame 101 may be lifted off the floor surface 150 with a lift mechanism 136, which is connected to the dolly frame 101. FIG. 1 also shows the lift mechanism 136 depicted as a jack frame element 105 and jack assembly 108. The lift mechanism 136 may be used to lift the vehicle off the floor surface 150 for storage, maintenance, cleaning, or other such activities where it is desirable for a vehicle to be lifted. The lift mechanism 136 may lift the vehicle perpendicular to the floor plane xy while the vehicle is supported by the dolly frame 101 from below in a position of symmetry along a first direction y perpendicular to a second direction x. The lift mechanism 136 may be motorized or manual powered.

Figure 2A:
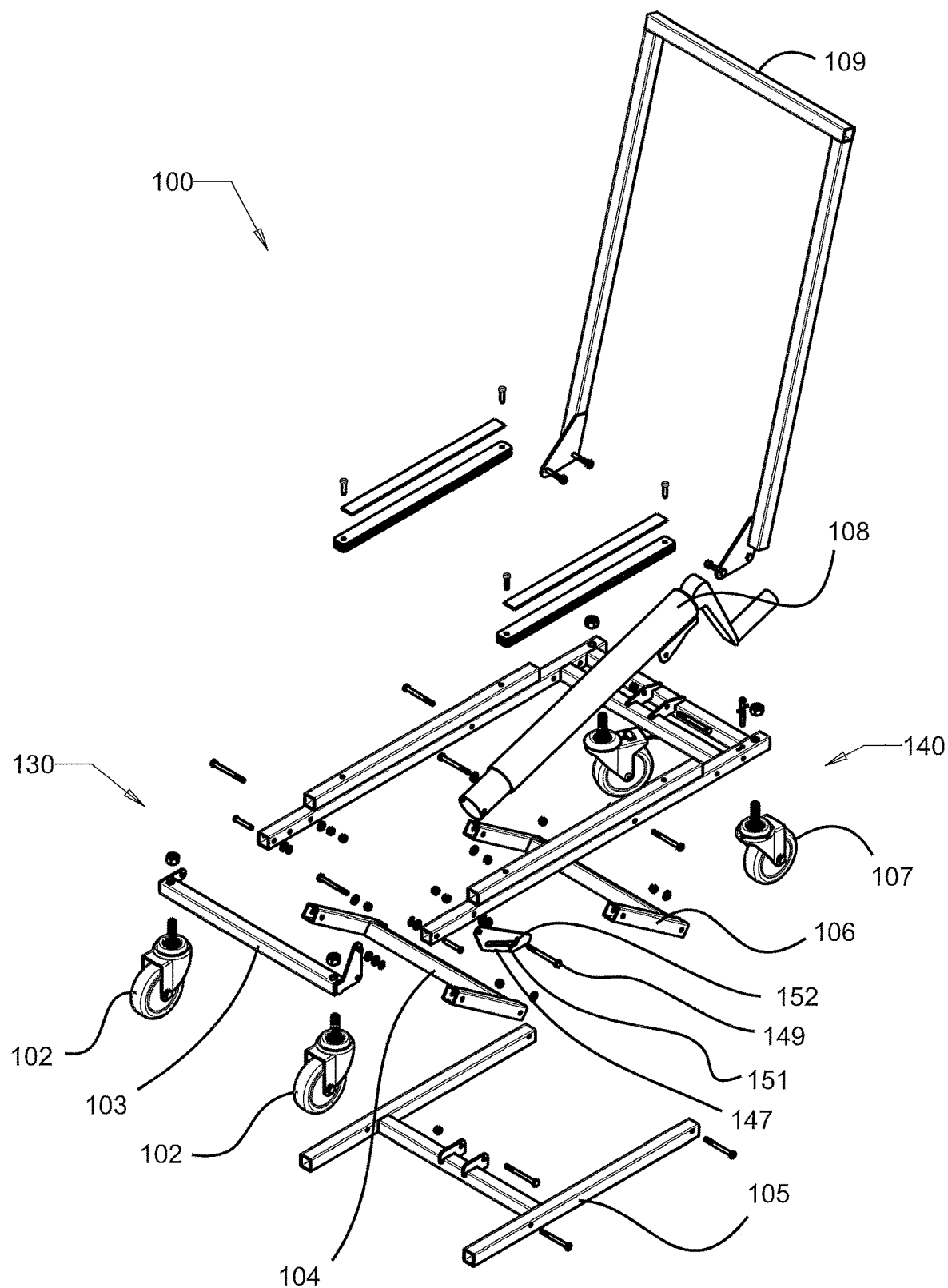
FIG. 2A is an exploded isometric view of the lift assembly depicting one hinged frame element.

FIG. 2A shows an exploded view of the features depicted in FIG. 1.

Figure 2B:
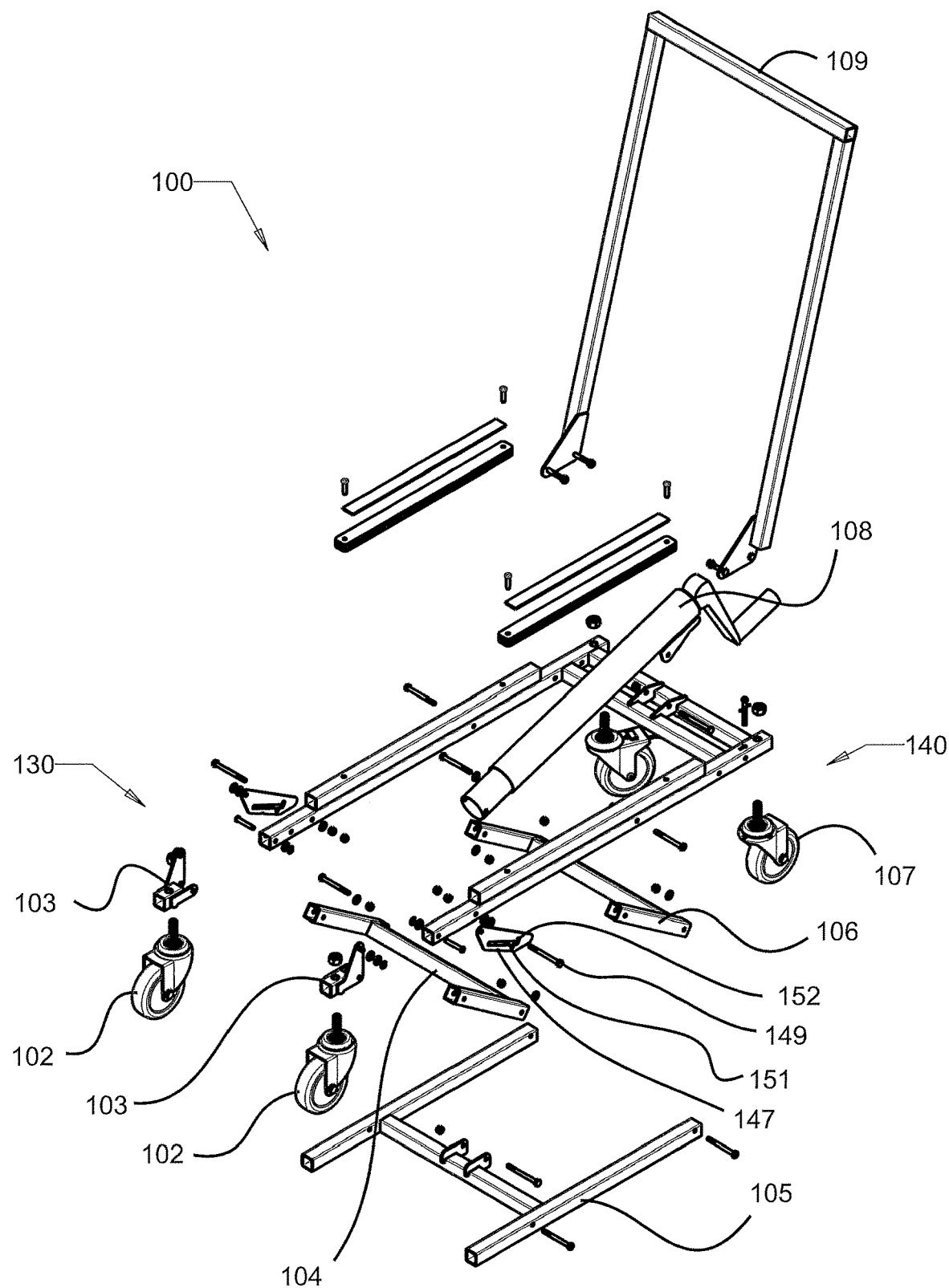
FIG. 2B is an exploded view of the lift assembly depicting two hinged frame elements.
Figure 2C:
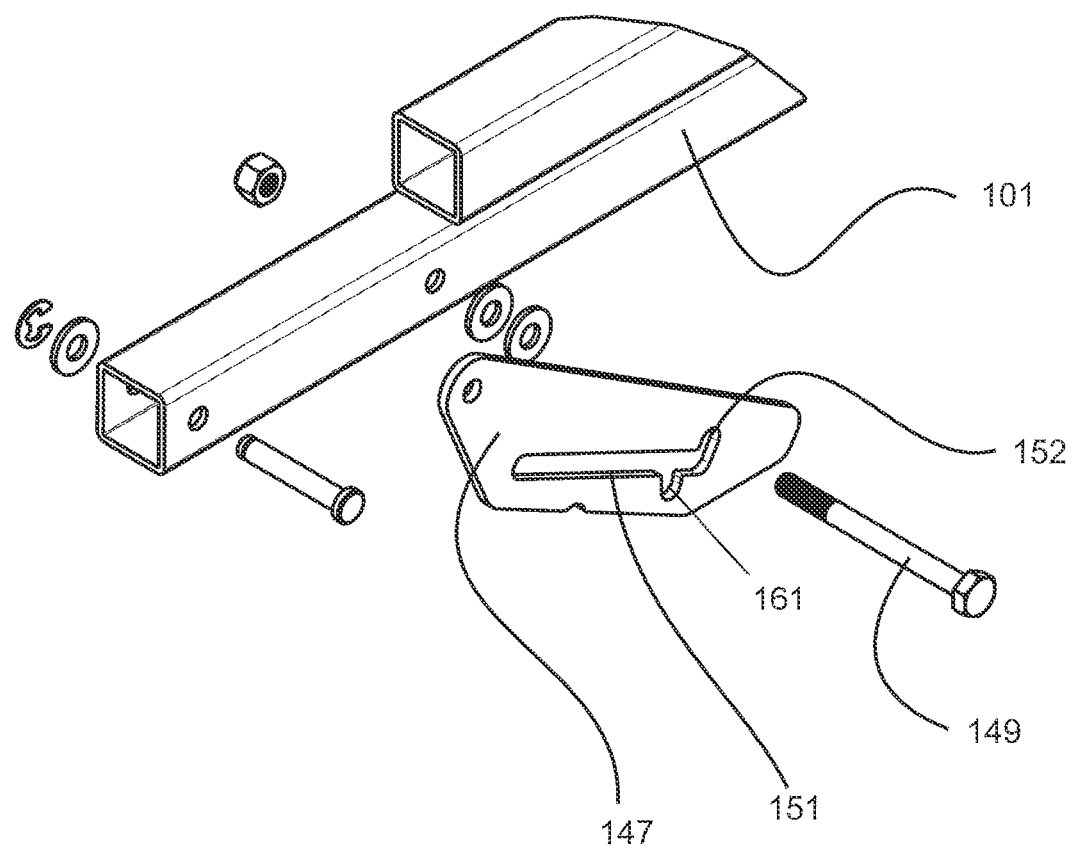
FIG. 2C depicts the lock plate with the dolly frame in an exploded view.

In another embodiment the lift assembly may include multiple hinged frame elements 103. FIG. 2B depicts the lift assembly with two hinged frame elements 103, allowing for clearance at the center of the lift assembly for vehicles with an obstruction thereat, such as a kickstand.

Figure 3:
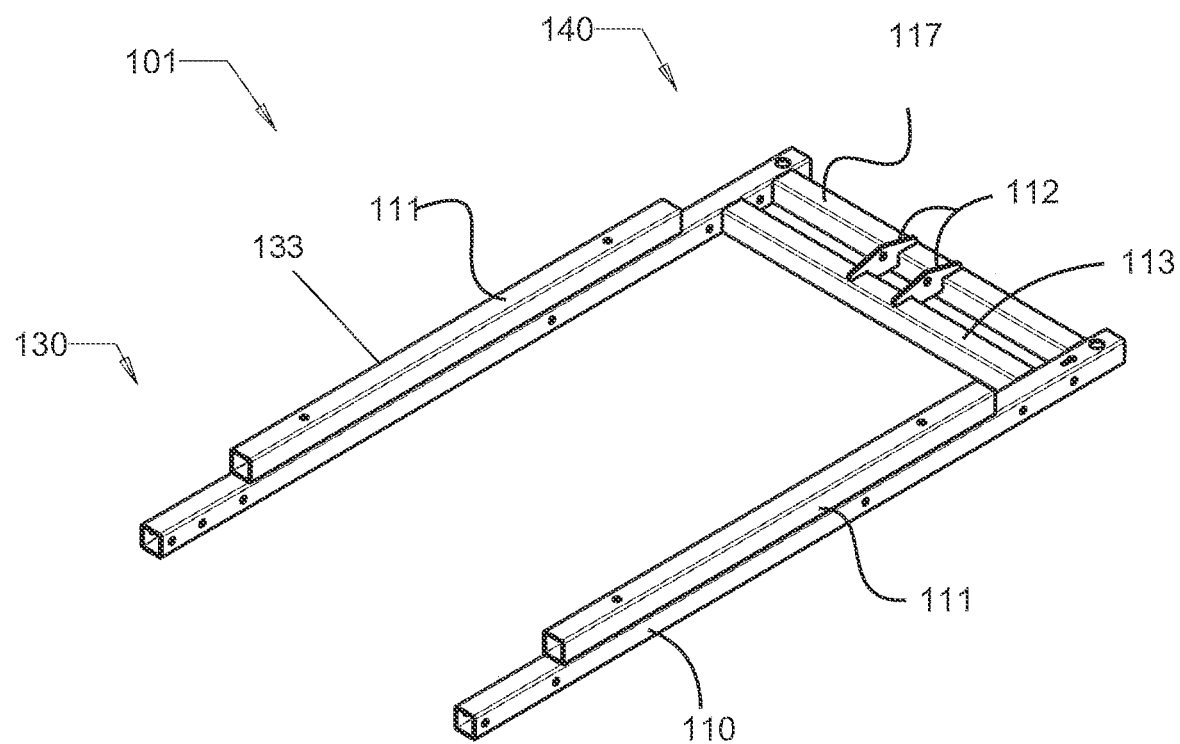
FIG. 3 is a perspective view of the lift dolly frame.

FIG. 3 shows the dolly frame 101. The dolly frame 101 may be constructed from metal, such as aluminum or steel, or a durable plastic material. A dolly frame made of metal may be formed by welding, brazing, or attaching with screws, bolts, clips, or any other attachment mechanism. In one embodiment, the dolly frame 101 includes at least one cross tube 117, oriented substantially in the x direction, and main frame tubes 110 oriented substantially in the y direction and attached to the ends of the at least one cross tube 117. A further embodiment includes two cross tubes, a first cross tube 113 and a second cross tube 117, wherein the second cross tube 117 is located at the back portion 140 of the dolly frame 101 and the first cross tube 113 is located at any position along the dolly frame 101. Support tubes 111 may be located on top of main frame tubes 110 to provide added support to the dolly frame 101. At the back cross tube 117, a jack mount 112 may be located to attach a jack assembly 108.

Figure 4:
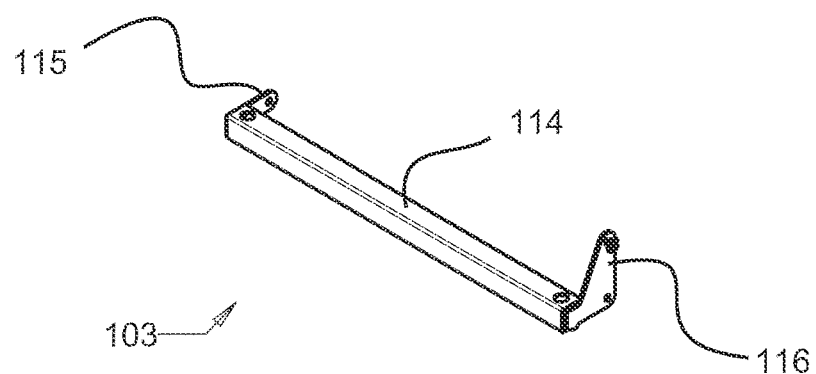
FIG. 4 is a perspective view of the hinged frame element.

FIG. 4 depicts a hinged frame element 103 as shown in FIG. 1. The hinged frame element 103 includes a hinged frame cross tube 114 with holes on either end to mount wheels. Such wheels may be caster assemblies. The hinged frame element 103 may alternatively be multiple hinged frame elements 103, as depicted in FIG. 2B which shows two hinged frame elements. In one embodiment, each of the multiple hinged frame elements includes a short cross tube 114 and includes one wheel mount hole. Such embodiment allows each shortened hinged element to operate independently and provides clearance to kickstands on vehicles where the kickstand location falls between the hinged elements.

In one embodiment, a hinge pivot plate 115 is located on one side of the hinged frame cross tube 114 and a hinge pivot brace 116 is located on the other side of the hinged frame cross tube 114. The hinged frame element 103 may be hingedly connected to the front portion 130 of the dolly frame 103 via pivot plate 115 and hinge pivot brace 116. Additionally, as depicted in FIG. 1, the hinged pivot brace 116 may be pivotally connected to the lock plate 147.

Figure 5:
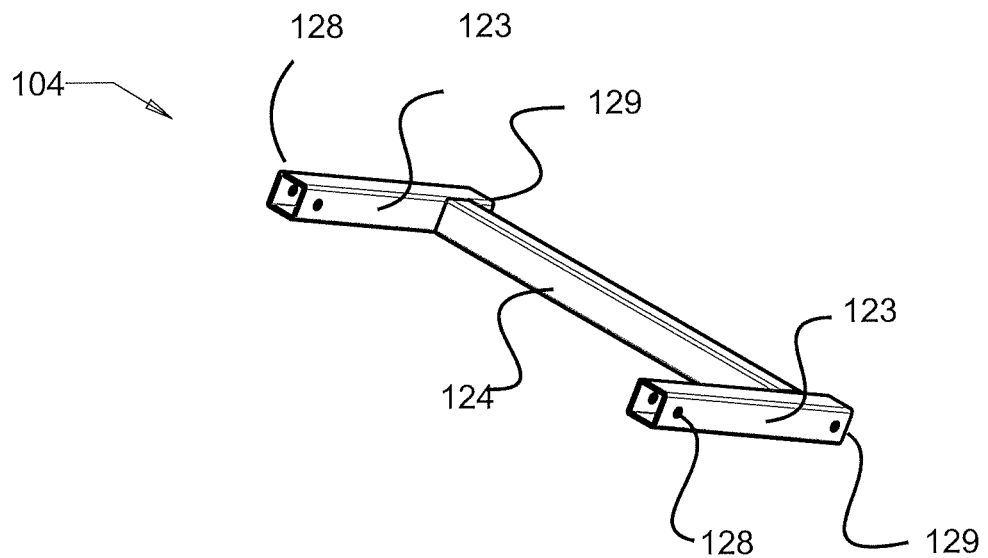
FIG. 5 is a perspective view of the front leg.
Figure 6:
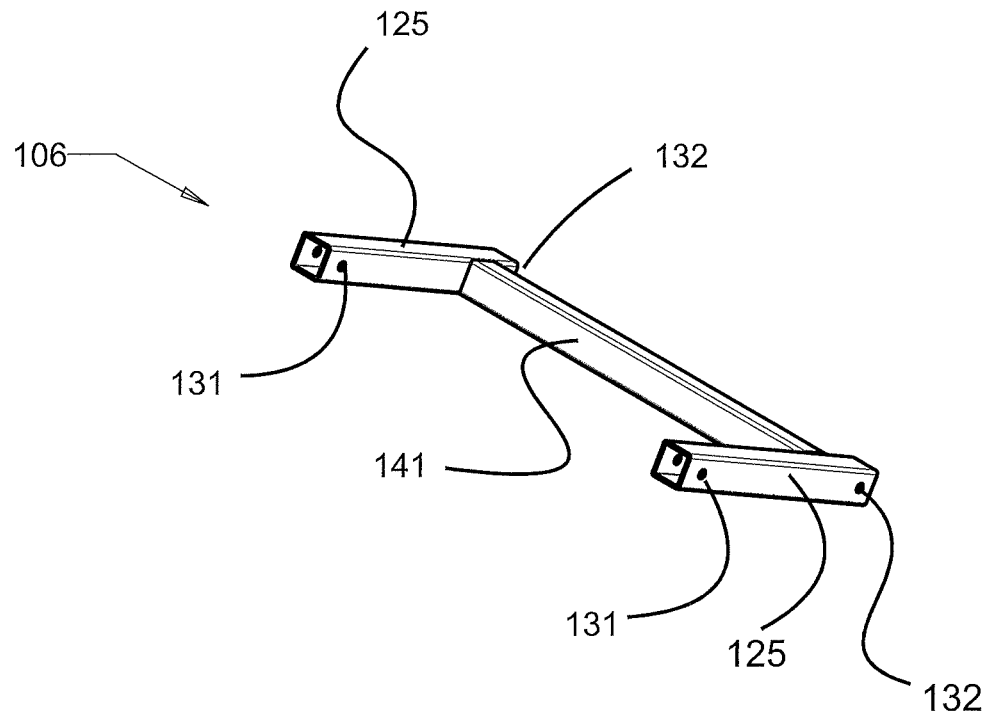
FIG. 6 is a perspective view of the rear leg.

FIGS. 5 and 6 depict the front leg 104 and rear leg 106 of the lift mechanism 136. In one embodiment, the lift mechanism 136 is a four-bar linkage jack, wherein the lift mechanism lifts from under the dolly frame 101 using a jack foot 105 to lift against a floor surface. The front leg 104 and rear leg 106 may be connected to the dolly frame 101 at the upper portions of the legs 104,106 and connected to a jack foot 105 at the lower portions of the legs 104,106. In one embodiment, the front leg 104 may include a cross member 124 supporting tubes 123 at either end of the cross member 124, wherein the upper portions 128 of the tubes 123 are connected to the dolly frame 101 and the lower portions 129 of the tubes 123 are connected to a jack foot 106. Similarly, rear leg 106 may include a cross member 141 supporting tubes 125 at either end of the cross member 124, wherein the upper portions 131 of the tubes 125 are connected to the dolly frame 101 and the lower portions 132 of the tubes 125 are connected to the jack foot 105. In further embodiment the lift mechanism 136 may be located on top of the dolly frame 101. This may be particularly useful with ATVs and UTVs wherein there is larger clearance between the floor and the vehicle frame in which to fit the lift mechanism 136 on top of the dolly frame 101.

Figure 7:
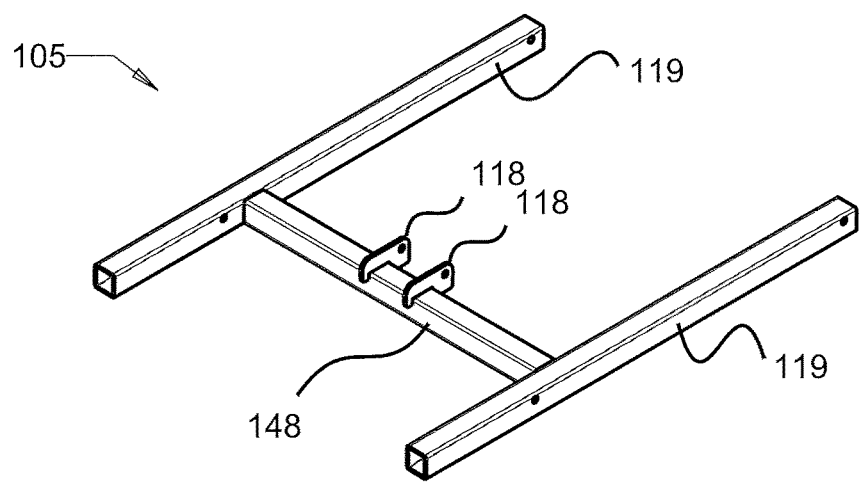
FIG. 7 is a perspective view of the jack foot.

FIG. 7 shows the jack foot 105. The jack foot 105 may include a jack foot cross member 148, jack foot mount 118, and two jack foot legs 119. The jack foot legs 119 are on either side of the jack foot cross member 148. The jack foot mount 118 may be attached to the jack foot cross member 148. The jack foot mount 118 may be connected to a jack assembly 108.

As shown in FIG. 1, the lift mechanism 136 may be operated by a jack assembly 108 with a handle or crank 137. In one embodiment the hand crank 137 may be operated in a first direction to lower the lift mechanism 136, and operated in a second direction to raise the lift mechanism 136. A manually powered jack assembly 108 is simple and safer than a hydraulic jack assembly for an operator to use and requires little maintenance. In a further embodiment, the lift mechanism 136 may be operated by a jack assembly 108 with at least one chosen from a cordless drill, a screwdriver, and a motor.

Figure 8:
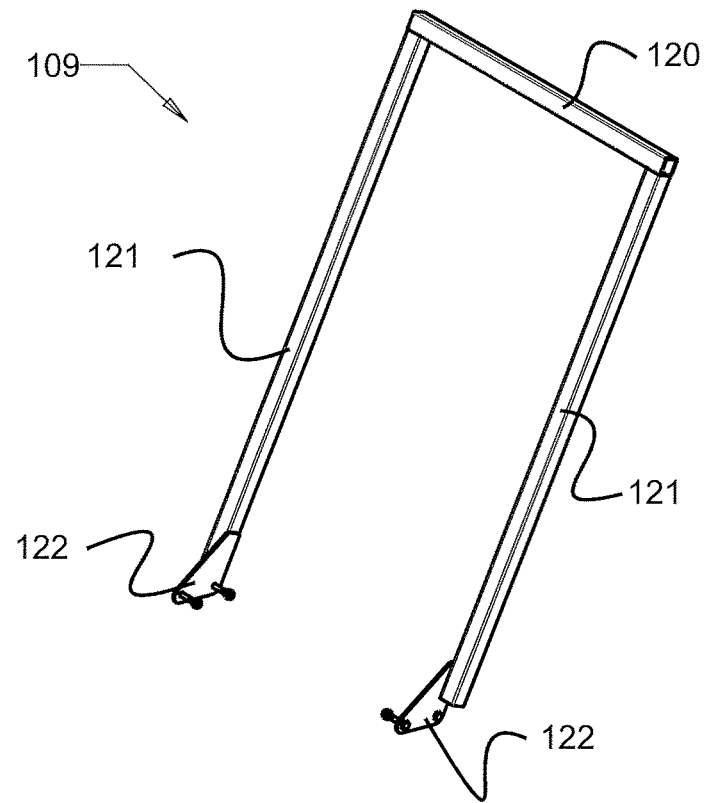
FIG. 8 is a perspective view of the handle component.

As shown in FIG. 8, one embodiment may include a handle 109 used to maneuver the lift assembly 100. The handle 109 may be removable. The handle 109 allows for movement of the lift assembly 100 without having to touch the vehicle. The handle 109 may be a rod attached to the frame 101. The handle 109, shown for example in FIG. 8, may also be used which includes two handle support members 121 attached at the dolly frame 101 by handle brackets 122. The two handle support members are attached at the opposite ends by a handle cross member 120, which may include a handle grip.

Figure 9:
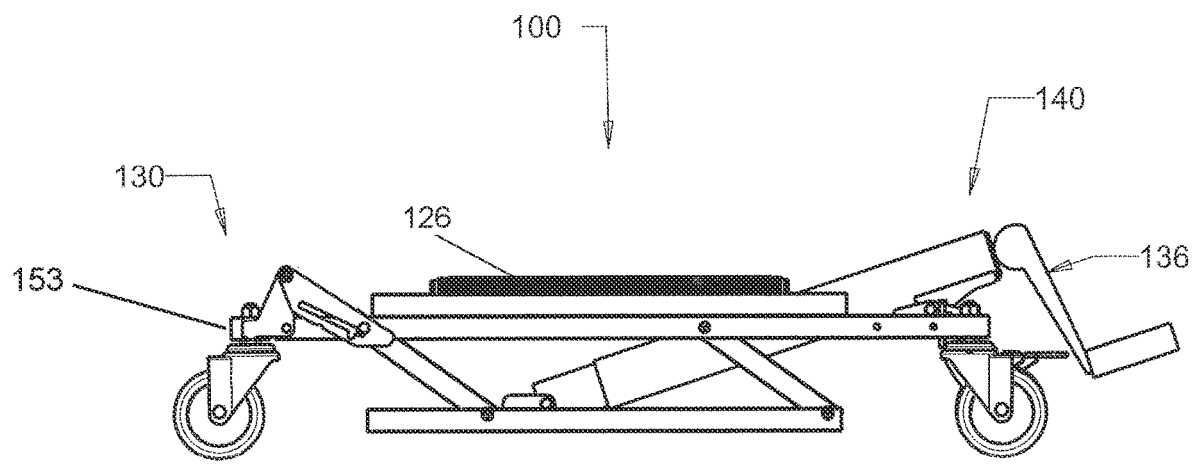
FIG. 9 is a side view of the lift assembly.
Figure 10:
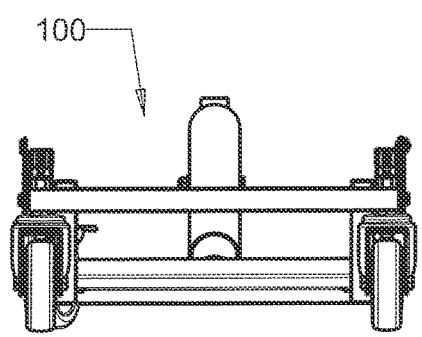
FIG. 10 is a front view of the lift assembly.

FIGS. 9 and 10 show a side and front view of the lift assembly 100, respectively.

Figure 11:
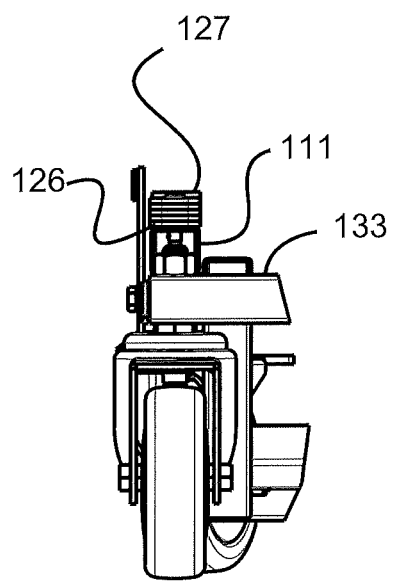
FIG. 11 is a front view of spacer on support frame at front vehicle location.
Figure 12:
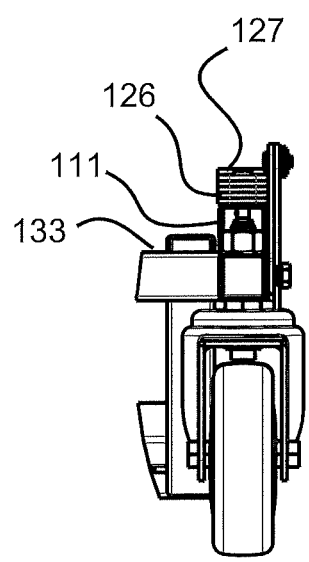
FIG. 12 is a front view of spacer on support frame at rear vehicle location.
Figure 13:
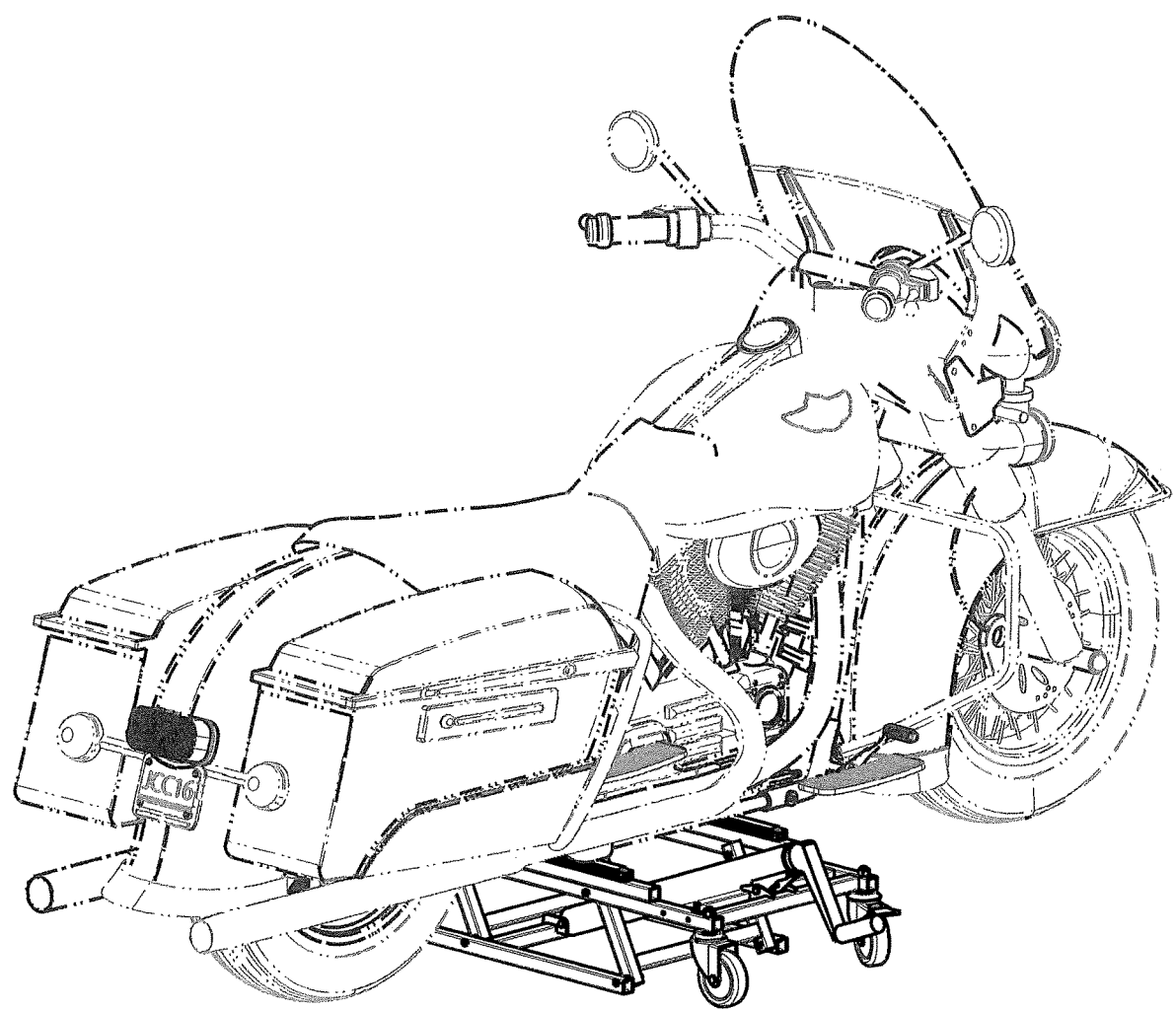
FIG. 13 depicts a phantom motorcycle on the lift assembly.

In one embodiment, the lift assembly may be adjusted to support vehicles at different heights on the vehicle as shown in FIG. 11. A top surface 133 of the dolly frame 101 may include the top surface of support tubes 111, and may have one or more spacers 126 attached to lift a vehicle that has an increased frame to ground clearance at the front or the rear of the vehicle frame depending on the frame of the vehicle. Spacers 126 increase a front lifting height and/or a rear lifting height to meet the frame of the vehicle and to accommodate differences in the frame of the vehicle and allow the vehicle to be lifted in substantially the same orientation along the xy plane as when the vehicle is in use. Spacers 126 may be metal, plastic, wood, or any material that resists compression. As shown in FIGS. 11 and 12, a pad 127 may also be added to the dolly frame 101 or a spacer 126 to prevent slippage or provide a cushion for the frame of the vehicle so it doesn't get scuffed or scratched. The pad 127 may be made of rubber, plastic, silicone or other such compressible and/or non-slip material. In one embodiment, a spring may be located at a top surface of the dolly frame 101 to further cushion and support the frame of the vehicle.

In another embodiment, the top surface 133 of the dolly frame 101 may include one or more additional brackets that serve supporting members. Such brackets may be constructed of materials including steel and aluminum and may be fabricated with a plurality of holes configured to allow adjustment of a front and/or rear lifting height to accommodate varying frame heights of vehicles.

Figure 14:
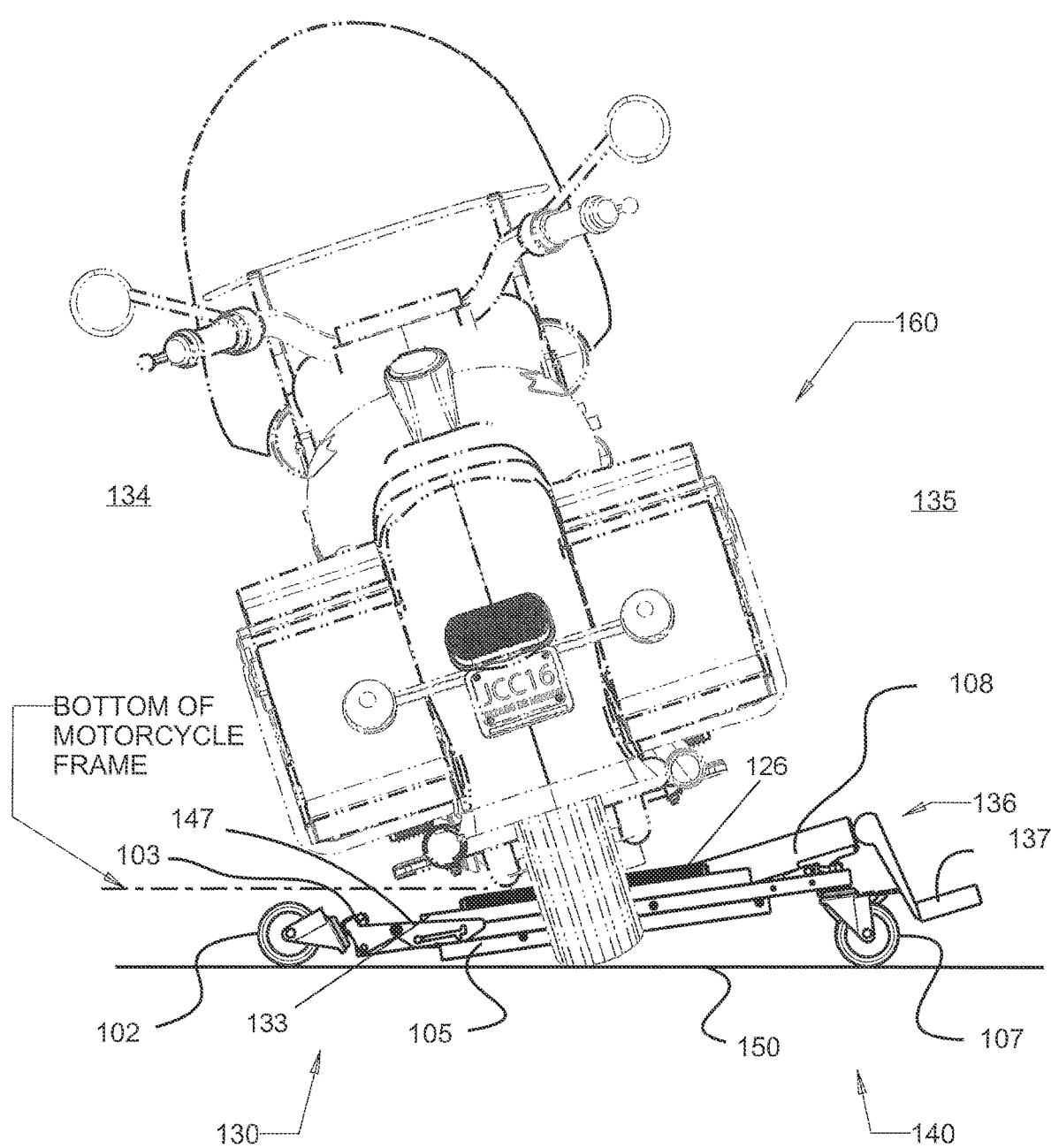
FIG. 14 is a view from rear of a motorcycle as the lift assembly is rolled into position between front and rear wheel of motorcycle, in a first position with front wheels raked out and the lift mechanism retracted.
Figure 15:
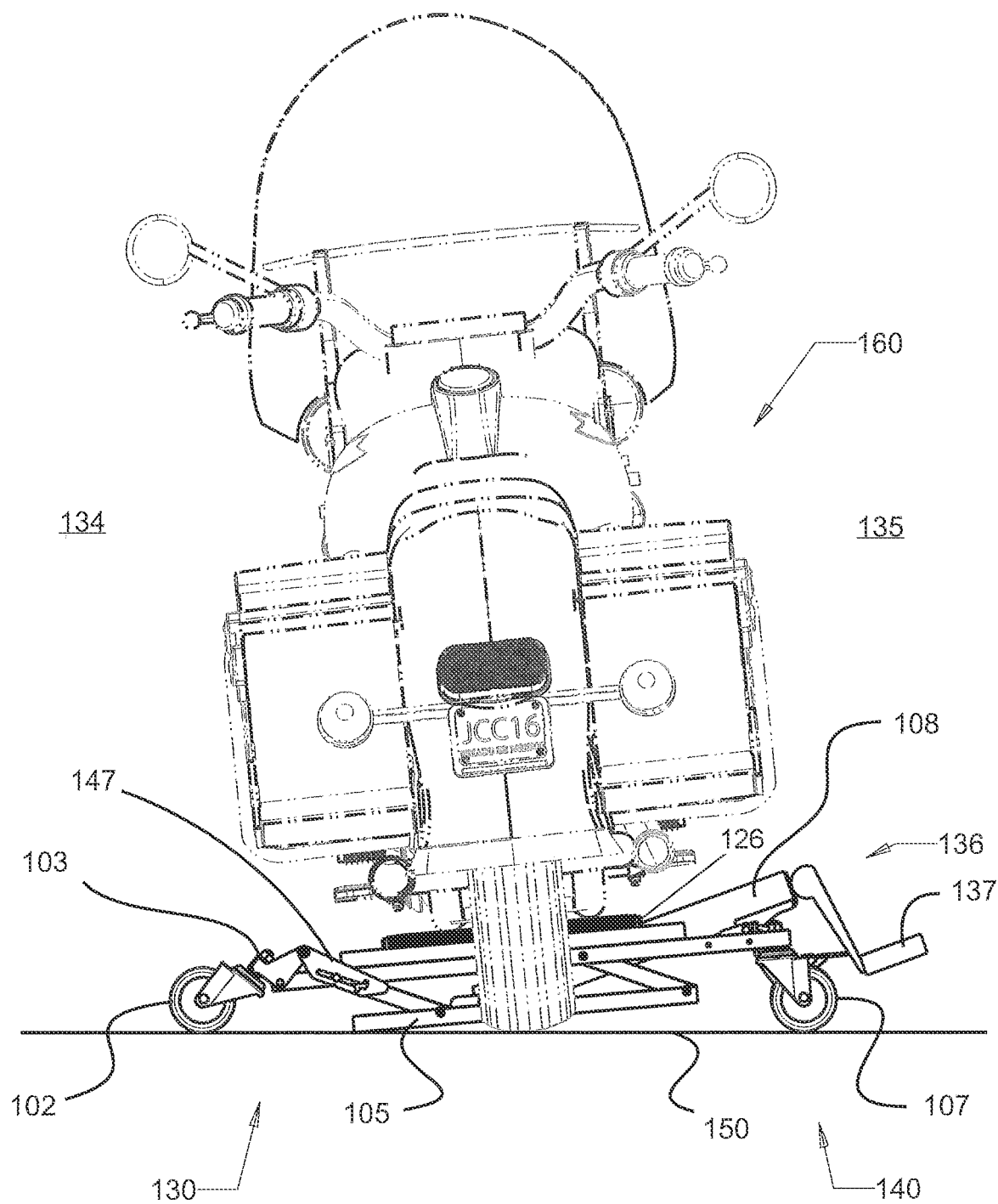
FIG. 15 is a view from rear of a motorcycle as the lift assembly is raised, making contact with motorcycle frame, and lifting motorcycle off the kickstand.
Figure 16:
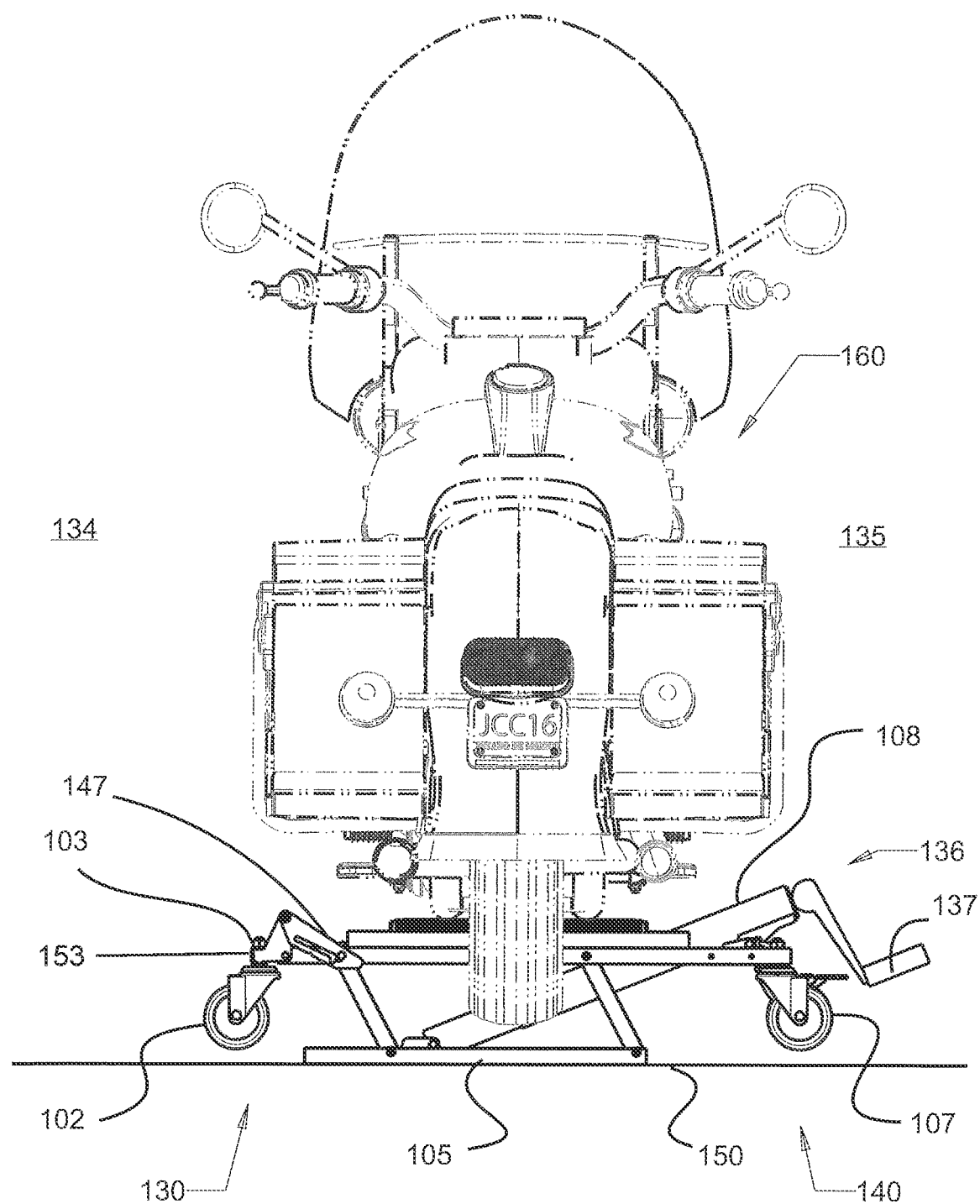
FIG. 16 is a view from the rear as the lift elevates the motorcycle and dolly frame off the ground.

FIGS. 13-20 show an embodiment of the lift assembly 100 in use with a vehicle 160, namely a motorcycle. FIG. 14 shows the motorcycle 160 parked on a floor surface 150 with its kickstand down and oriented toward the left side 134. The lift assembly 100 enters from the right side 135 of the motorcycle 160 moving left. It is in a first position described above, with the wheels 102 raked out at an angle in front of the lift assembly 100 such that the wheels 102 are still engaged with the floor surface 150 and supporting the lift assembly 100, but the front portion 130 of the dolly frame 101 is in a lowered position going under the motorcycle 160. The lift assembly 100 is rolled into place from a side of the motorcycle opposite the kickstand. Entering from this direction acts as a failsafe in case the lift assembly 100 pushes the motorcycle in the direction from which it is entering. FIGS. 15 and 16 show the movement of the wheels 102 from the raked out first position to the second position wherein the wheels 102 are located under the dolly frame 101 as the lift mechanism 136 is utilized.

Figure 17:
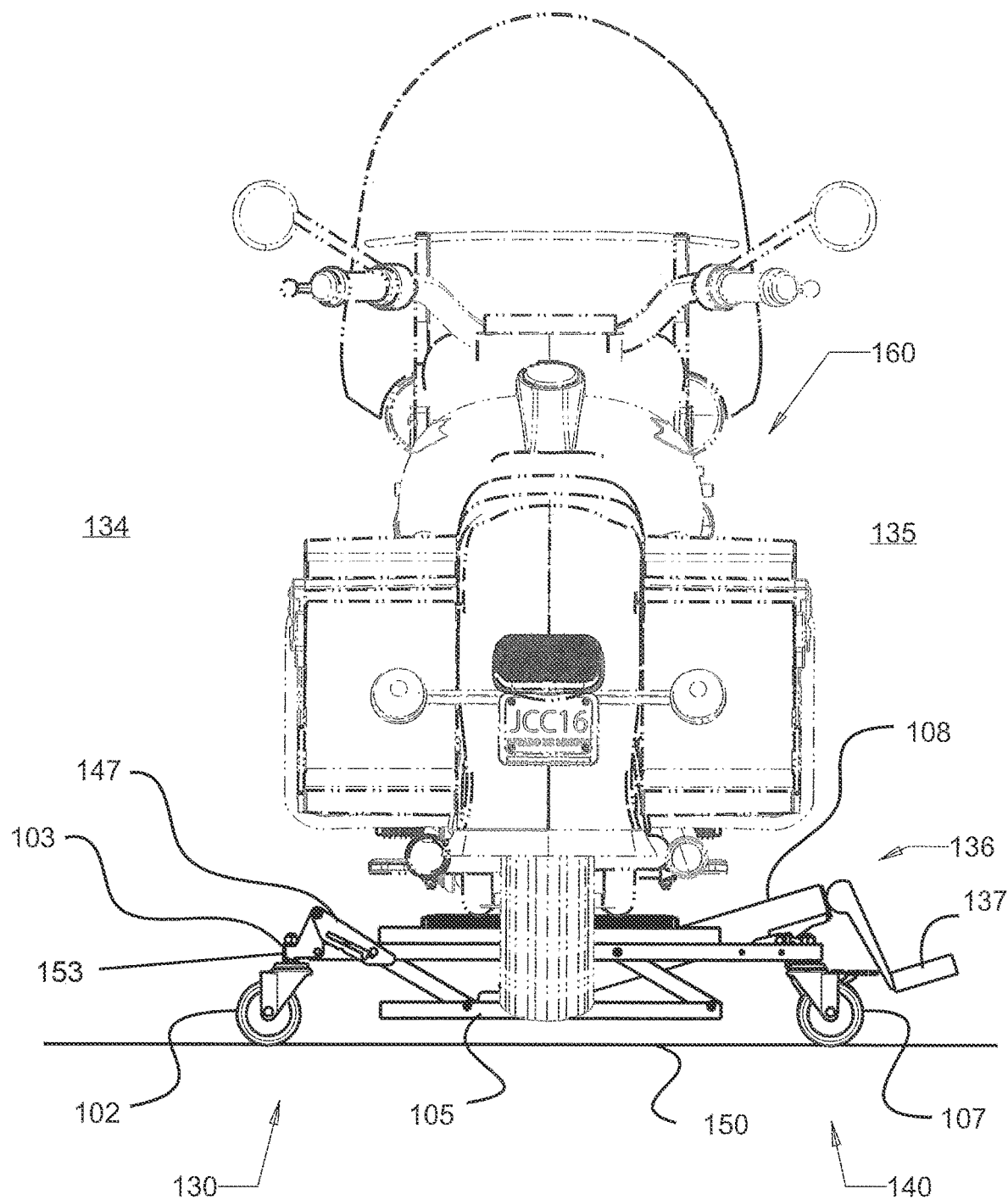
FIG. 17 is a view from rear as the lift mechanism is retracted and the dolly frame supports the motorcycle.
Figure 18:
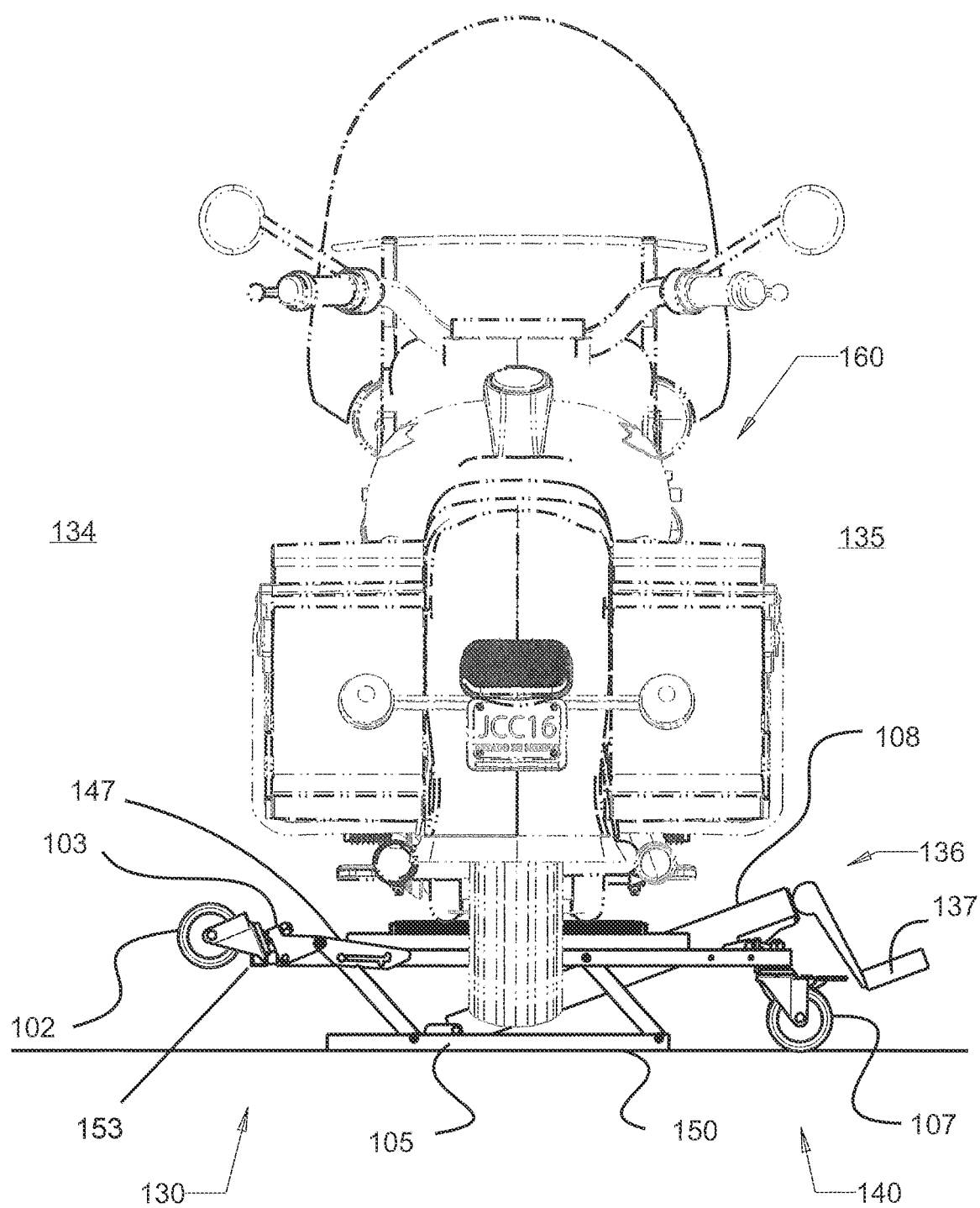
FIG. 18 is a view of from the rear with the lift mechanism supporting the motorcycle and dolly and the hinged frame element is locked in a raked out, first position to enable lowering of the motorcycle to its kickstand.

The lift mechanism 136 may be used to lift the vehicle 160 off the floor surface 150. As stated, the lift mechanism 136 may be motorized or manual powered and may include a lever or a crank 137. For example, as shown in FIG. 17, a jack assembly 108 and jack foot 105 may be used. In the embodiment in FIG. 17, the user turns the handle 137 of the jack assembly 108 to operate the lift. For example, a turn clockwise will raise the lift and a turn counter-clockwise will lower the lift. The jack assembly 108 may be mounted in a low-profile orientation so that the user can reach and turn its crank while in a crouched, low position observing the position of the lift assembly 100 as it meets the underside of the vehicle frame. In another embodiment, the jack assembly could be mounted and connected in an upright orientation. The lift assembly 100 is used to lift the motorcycle up while simultaneously allowing hinged frame element 103 to pivot down into its supporting, second position.

As the motorcycle 160 is lifted, the lock plate 147 may lock the hinged frame element 103 in its supporting, second position due to gravity once the dolly frame 101 has reached a horizontal position just high enough that the wheels 102, 107 are lifted off the floor surface 150. In another embodiment, the lock plate 147 may lock the hinged frame element 103 using a spring. At this point, the vehicle's wheels may be approximately 1-2" off the floor surface 150. The user can further deploy the lift assembly 100 to raise the supported vehicle higher, as shown in FIG. 16, removing weight from the wheels 102, 107. This can be done for storage once the vehicle is rolled into a desired location so that wheels 102, 107 are not deformed over time under load and to prevent the dolly from moving while unattended. This elevated position also makes it easier to conduct routine maintenance, washing and cleaning of the vehicle. In another embodiment, a locking mechanism may include a manual lever to lock the hinged frame element 103 into place in a second position.

Once the hinged frame element 103 has been locked into place in a second position, the user may lower the dolly frame 101 using the lift mechanism 136 such that the wheels 102, 107 are supporting the weight of the vehicle and the foot 105 of the lift mechanism 136 will rise off the floor surface 150 as shown in FIG. 17. Once the foot 105 is approximately ½" off the floor surface 150, the lift assembly 100 can be used as a dolly, allowing the user to easily move the supported motor vehicle. Any combination of the wheels 102, 107 may also include a positional locking mechanism to keep the lift assembly 100 from rolling while the wheels 102, 107 are engaged so that the lift assembly 100 may be safely parked while unattended.

The lift assembly 100 may be used to make servicing, washing and detailing the vehicle much easier by holding the vehicle upright and off the floor surface 150 in a stable position. The lift assembly 100 lifts and supports a vehicle at its frame rather than its wheels. This allows the user to freely spin the vehicle's front and back wheels while cleaning the rims and tires. A front wheel assembly of the vehicle can also be freely turned from right to left giving the user greater access to cleaning it and the nearby frame. The lift assembly may support the vehicle in an elevated, stable position such that an operator may sit, put his or her feet on the foot pedals, put his or her hands on the handlebars, and turn the handlebars to move the wheels of the vehicle safely while the lift assembly will inhibit other movement of the vehicle.

Figure 19:
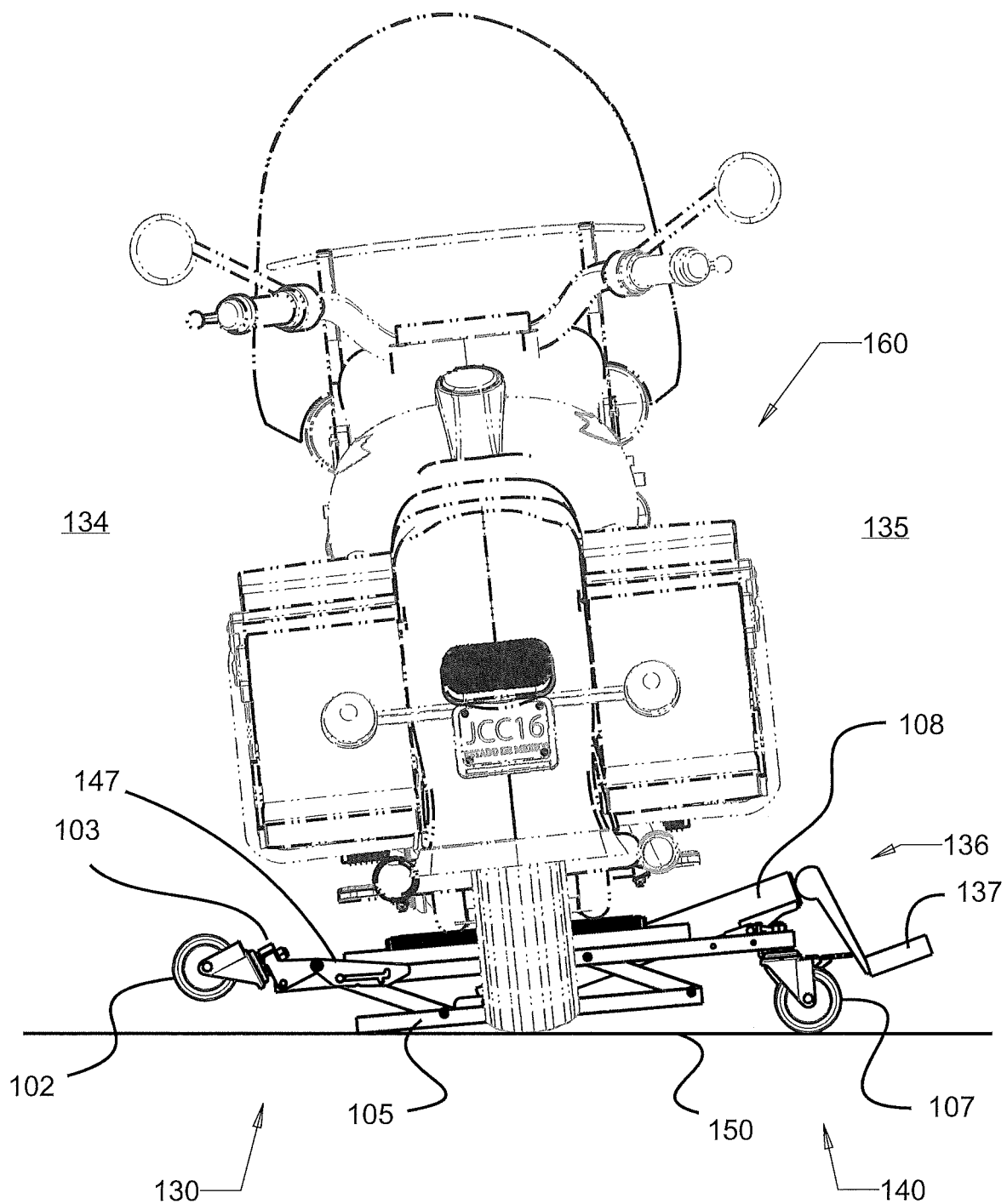
FIG. 19 is a view from the rear with the lift mechanism engaged as the lift assembly is lowered to allow the motorcycle wheels to touch the ground and lower the front portion of the dolly frame.
Figure 20:
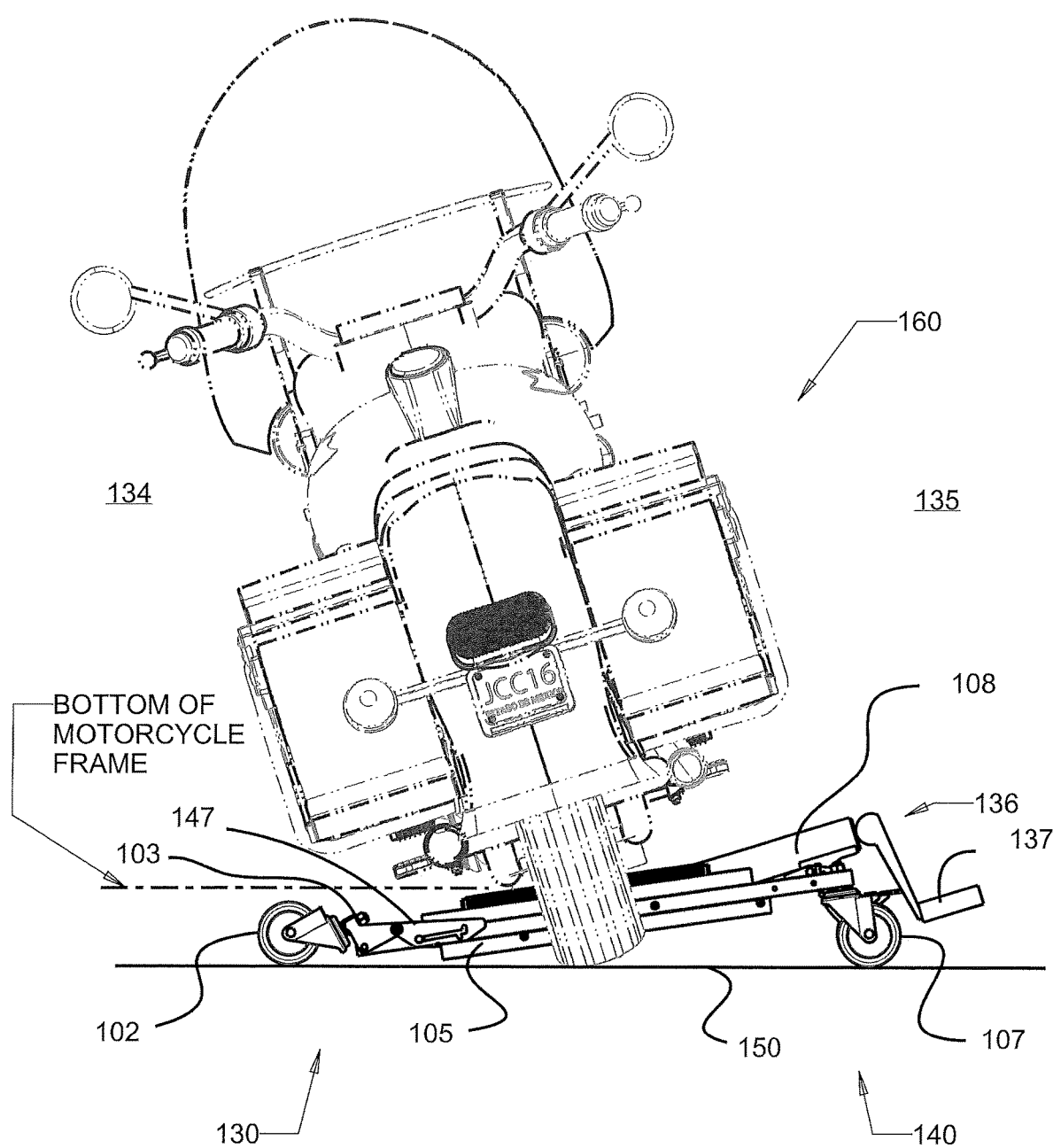
FIG. 20 is a view from the rear as the motorcycle leans onto its kickstand and as the dolly frame is lowered to its lowest position and is supported by the front wheels in their raked position.

To get the vehicle off the lift assembly 100, the user begins by positioning the lift assembly 100 high enough to get the wheels 102, 107 free of supporting weight as shown in FIG. 16. The user then unlocks the locking mechanism of the hinged frame element 103 and raises the hinged frame element 103 and positions the locking mechanism, such as lock plate 147 shown in FIG. 18, such that locking in the second position is not attained when the lift is lowered. As the user lowers the lift assembly 100, using the lift mechanism 136, for example the jack assembly 108 and jack foot 105, the front portion 130 of the dolly frame 101 will automatically slant towards the kickstand side of the vehicle as depicted in FIG. 19, and will allow the vehicle to come to rest on its kickstand as shown in FIG. 20.

The jack assembly 108 may be a screw type mechanical jack. In one embodiment, the jack assembly 108 includes a hand cranked jack and a four-bar linkage. In another embodiment, the four-bar mechanism may include a sliding joint to allow the four-bar linkage to operate in a range that is deviates from parallel four-bar motion.

Continued "lowering" of the lift assembly 100 will result in the foot 105 of the lift mechanism 136 retracting up off the floor surface 150 as the wheels 102, 107 contact the floor surface 150 and support the frame of the lift assembly 100. Once the lift mechanism 136 is fully retracted, the user can roll the lift assembly 100 out from under the vehicle. The lift assembly 100 can be left in its slanted orientation, or the user may manually lift the front portion 130 of the dolly frame 101 up, allowing hinged frame element 103 to drop and lock in place, holding the dolly frame 101 in a level position allowing full wheel caster movement if desired.

Any combination of the wheels 102, 107 may include casters. In one embodiment, each of the wheels 102, 107 includes an independent caster. In a further embodiment, each of the wheels 102, 107 may turn 360 degrees. The wheels 102, 107 may include caster directional locks to lock the wheels in alignment with one another for better directional control while moving the lift assembly 100 and supported vehicle, similar to that of a shopping cart.

The lift assembly 100 may lift the vehicle by its frame. However, in another embodiment the lift assembly 100 lifts the vehicle by its foot pegs, floor boards, or other structural component of the vehicle.

The lift assembly 100 may include at least one powered drive wheel to facilitate moving the lift assembly around via a remote or a mounted joystick similar to the methods employed on electric wheel chairs, scooters, and foot boards. The lift assembly 100 may be used for any vehicle, particularly motorcycles, trikes, ATVs, UTVs with any number of wheels, lawnmowers, tractors, snowblowers, and snowmobiles.

The integrated features of the lift assembly 100 allow for a lightweight design. In one embodiment the lift assembly 100 weighs approximately thirty-five pounds. The lightweight design combined with the large wheels allow for movement of the lift assembly 100 with less force by an operator.

What is claimed is:

1. A lift assembly for a vehicle, comprising:
    a dolly frame located on a floor surface, wherein the dolly frame includes:
        a front portion located at a leading edge of the dolly frame;
        a back portion;
        a hinged frame element hingedly connected to the front portion at the leading edge of the dolly frame;
        a plurality of wheels, wherein at least one wheel of the plurality of wheels is connected to the hinged frame element;
        wherein in a first position of the dolly frame, the hinged frame element is pivoted at an angle relative to the front portion to lower the front portion relative to the back portion, wherein the at least one wheel pivots at an angle one chosen from underneath the front portion located at the leading edge of the dolly frame and away from the front portion and ahead of the leading edge of the dolly frame to support the front portion in the first position;
        wherein in a second position of the dolly frame, the hinged frame element is positioned such that the at least one wheel is directly below the front portion with respect to the floor surface and the front portion and the back portion are level with each other relative to the floor surface; and
    a lift mechanism integrally connected to the dolly frame to selectably lift and lower the dolly frame.

2. The lift assembly according to claim 1, wherein the lift mechanism lifts the dolly frame to allow the hinged frame element to pivot relative to the front portion to raise the front portion to the second position.

3. The lift assembly according to claim 1, wherein the hinged frame element includes two of the hinged frame elements on either side of the front portion.

4. The lift assembly according to claim 1, wherein the at least one wheel of the plurality of wheels includes a wheel diameter which is greater than 80% of a distance from the floor surface to a bottom of a frame of the vehicle.

5. The lift assembly according to claim 1, wherein the at least one wheel of the plurality of wheels includes a caster assembly including a caster wheel, wherein the caster assembly further comprises:
    a mounting height, wherein the mounting height is a distance between the floor surface and a bottom of the dolly frame; and
    a total height, wherein the total height is a distance between the floor surface and a top of the caster assembly;
    wherein in the first position, the caster assembly is pivoted at the angle one chosen from underneath the front portion located at the leading edge of the dolly frame and away from the front portion and ahead of the leading edge of the dolly frame; and wherein in the first position, both the mounting height and the total height are less than a diameter of the caster wheel; and wherein in the first position, while the caster wheel acts as a roller, supporting the dolly frame in the first position.

6. The lift assembly according to claim 1, wherein the at least one wheel of the plurality of wheels includes at least one chosen from:
   a directional locking caster to lock at least one of the plurality of wheels in alignment for directional control while moving the lift assembly and supported vehicle;
   a positional locking mechanism to lock the at least one wheel from rolling and caster movement; and
   an independent caster which turns 360 degrees.

7. The lift assembly according to claim 1, wherein the hinged frame element is hingedly connected to the dolly frame via a pin hinge.

8. The lift assembly according to claim 1, wherein the lift assembly further comprises:
   a guide pin located on the dolly frame; and
   a lock plate including an L-shaped channel through which the guide pin travels, wherein the L-shaped channel includes a lateral portion and a locking portion;
   wherein the lock plate is pivotably connected to the hinged frame element; and
   wherein in the first position of the dolly frame, the guide pin is in the lateral portion of the L-shaped channel, and wherein in the second position of the dolly frame, the guide pin is in the locking portion of the L-shaped channel.

9. The lift assembly according to claim 8, wherein
   the lateral portion of the L-shaped channel includes a first end and a second end, where the second end connects to the locking portion of the L-shaped channel;
   wherein the locking portion is angled upward with respect to the floor surface;
   wherein when the dolly frame is in the first position, the guide pin is located in the first end of the lateral portion of the L-shaped channel;
   wherein when the front portion of the dolly frame is raised from the first position to the second position, the guide pin moves through lateral portion of the L-shaped channel from the first end to the second end; and
   wherein when the dolly frame is in the second position, the guide pin is fitted into the locking portion of the L-shaped channel due to a gravitational force of the locking plate.

10. The lift assembly according to claim 9, wherein
    the lateral portion of the L-shaped channel includes a release notch between the first end and the second end;
    wherein the release notch is angled downward with respect to the floor surface;
    wherein when the dolly frame is in the second position the lock plate is selectably adjusted such that the guide pin is in the release notch; and
    wherein when the lift mechanism is lowered and supported by the floor, the guide pin travels from the release notch to the first end of the lateral portion of the L-shaped channel, and the dolly frame is lowered to the first position.

11. The lift assembly according to claim 1, wherein the dolly frame further comprises a top surface on which the vehicle rests when the vehicle is in a lifted position; and wherein the top surface further comprises:
    a front lifting height;
    a rear lifting height; and
    a spacer attached to the top surface to increase at least one chosen from a front lifting height and a rear lifting height to match a frame of the vehicle, allowing the vehicle to be lifted equally in a front of the vehicle corresponding to the front lifting height and in a rear of the vehicle corresponding to the rear lifting height.

12. The lift assembly according to claim 1, wherein the lift mechanism lifts the dolly frame using at least one chosen from a manual screw jack, a four-bar linkage jack, a single hydraulic jack, a multiple hydraulic jack, and a linear actuator.

13. The lift assembly according to claim 12, wherein the lift mechanism lifts the dolly frame using the four-bar linkage jack, and wherein the four-bar linkage jack includes at least one chosen from a manually operated handle, a cordless drill, a screwdriver, and a motor.

14. The lift assembly according to claim 1, further comprising at least one powered drive wheel to facilitate moving the lift assembly around via at least one chosen from a remote or a mounted joystick.

15. The lift assembly according to claim 1, wherein in the first position the front portion of the dolly frame includes a height which is less than or equal to a diameter of the at least one wheel, and wherein in the first position each of the plurality of wheels is engaged with the floor surface to roll the lift assembly.

16. The lift assembly according to claim 1, wherein in the second position of the dolly frame, the lift mechanism is engaged with the floor surface and each of the plurality of wheels are above the floor surface and not touching the floor surface, and wherein in a third position of the dolly frame, the hinged frame element is positioned such that the at least one wheel is directly below the front portion with respect to the floor surface and the front portion and the back portion are level with each other relative to the floor surface, and wherein each of the plurality of wheels is engaged with the floor surface to roll the lift assembly.

17. The lift assembly according to claim 1, wherein
    the lift mechanism further comprises a foot including a front end and a back end;
    wherein in the first position of the dolly frame, the front end of the foot selectably engages with the floor surface and to lift the front end of the dolly frame; and
    wherein in a third position of the dolly frame in which the front portion and back portion of the dolly frame are level to each other with respect to the floor, both of the front end of the foot and the back end of the foot selectably engage with the floor surface to lift the front portion of the dolly frame.

18. A lift assembly for lifting a load from a floor surface upon which the lift assembly and the load rest, comprising:
    a dolly frame including a front portion and a back portion located at opposite ends of the dolly frame;
    a lift connected to the dolly frame;
    a plurality of wheels attached to the dolly frame, wherein at least one wheel of the plurality of wheels is located at the front portion of the dolly frame, and wherein the at least one wheel adjustably pivots as the lift lowers the front portion relative to the back portion to a first position; and
    wherein the lift includes a foot located longitudinally between the back portion of the dolly frame and the at least one wheel located at the front portion of the dolly frame, wherein the foot directly abuts the floor surface, and wherein the lift raises the load to a lifted position supported by the foot directly abutting the floor surface.

19. A lift assembly for a vehicle, comprising:
a dolly frame located on a floor surface, wherein the dolly frame includes:
- a front portion located at a leading edge of the dolly frame;
- a back portion;
- a front hinged frame element hingedly connected the front portion at the leading edge of the dolly frame;
- a back hinged frame element hingedly connected to the back portion;
- a plurality of wheels, wherein at least one wheel of the plurality of wheels is connected to each of the front hinged frame element and the back hinged frame element;
- wherein in a first position of the dolly frame, the front hinged frame element is pivoted at an angle relative to the front portion to lower the front portion and the back hinged frame element is pivoted at an angle relative to the back portion to lower the back portion of the dolly frame, wherein each of the at least one wheels connected to each of the front hinged frame element and the back hinged frame element is pivoted at an angle one chosen from underneath the respective front portion and back portion and away from the respective front portion and back portion;
- wherein in a second position of the dolly frame, each of the front hinged frame element and the back hinged frame element are positioned such that each of the at least one wheels is directly below the respective front portion and back portion with respect to the floor surface and the front portion and the back portion are raised with respect to the floor surface from the first position; and a lift mechanism integrally connected to the dolly frame to selectably lift the dolly frame from the first position to the second position.

* * * * *